Feb. 25, 1930.  S. J. ROUTLEDGE  1,748,796
FRICTION WIRE BLOCK CLUTCH MECHANISM
Filed Sept. 9, 1927  2 Sheets-Sheet 1

Simpson J. Routledge
INVENTOR

Feb. 25, 1930.     S. J. ROUTLEDGE     1,748,796
FRICTION WIRE BLOCK CLUTCH MECHANISM
Filed Sept. 9, 1927     2 Sheets-Sheet 2
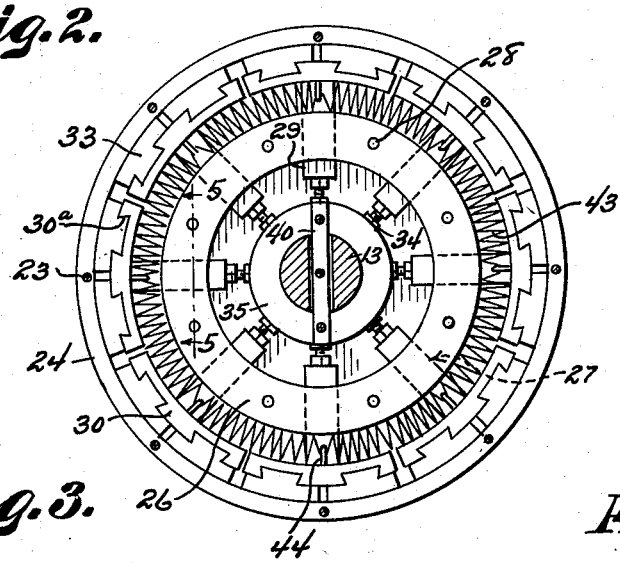
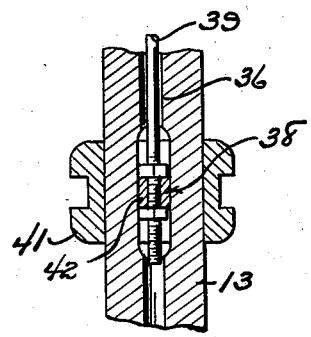
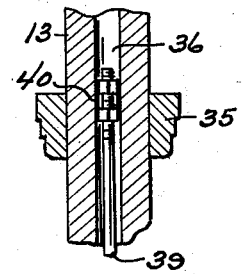
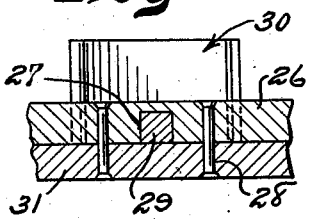
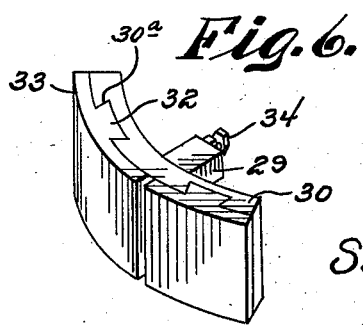
Simpson J. Routledge
INVENTOR Patented Feb. 25, 1930

1,748,796

UNITED STATES PATENT OFFICE

SIMPSON J. ROUTLEDGE, OF ENSLEY, ALABAMA

FRICTION WIRE-BLOCK CLUTCH MECHANISM

Application filed September 9, 1927. Serial No. 218,538.

The present invention relates to wire blocks and particularly to the clutch mechanism controlling said blocks.

Objects of the invention are to provide a friction clutch block by which acceleration of the wire blocks may be obtained at the beginning of the drawing of a wire whereby the fracturing of the hole in the die which the wire is drawn through and the breaking of the wire by a sudden jerk when the device is started may be avoided.

Other objects are the elimination of jarring and disfiguring of the gears and pinions of the machine caused by the sudden starting with the present style of machine.

In the drawings constituting a part of the specification,

Figure 2 is a section on the line 2—2 of Fig. 1, showing the clutch mechanism.

Figure 3 is a fragmentary sectional detail view on line 3—3 of Figure 1 of the spindle, showing the mounting of a guide ring on the spindle, and its connection with the clutch operating rod.

Figure 4 is a further fragmentary sectional view of the spindle showing the clutch operating cam mounted thereon and its connection with the cam operating rod, being taken on line 4—4 of Figure 1.

Figure 5 is a detail section on the line 5—5 of Figure 2 showing in a fragmentary manner the connection of the guide member of a clutch shoe in the aperture formed in the guide ring.

Figure 6 is a detail perspective view showing the clutch shoe and the guide member secured thereto.

Figure 1:
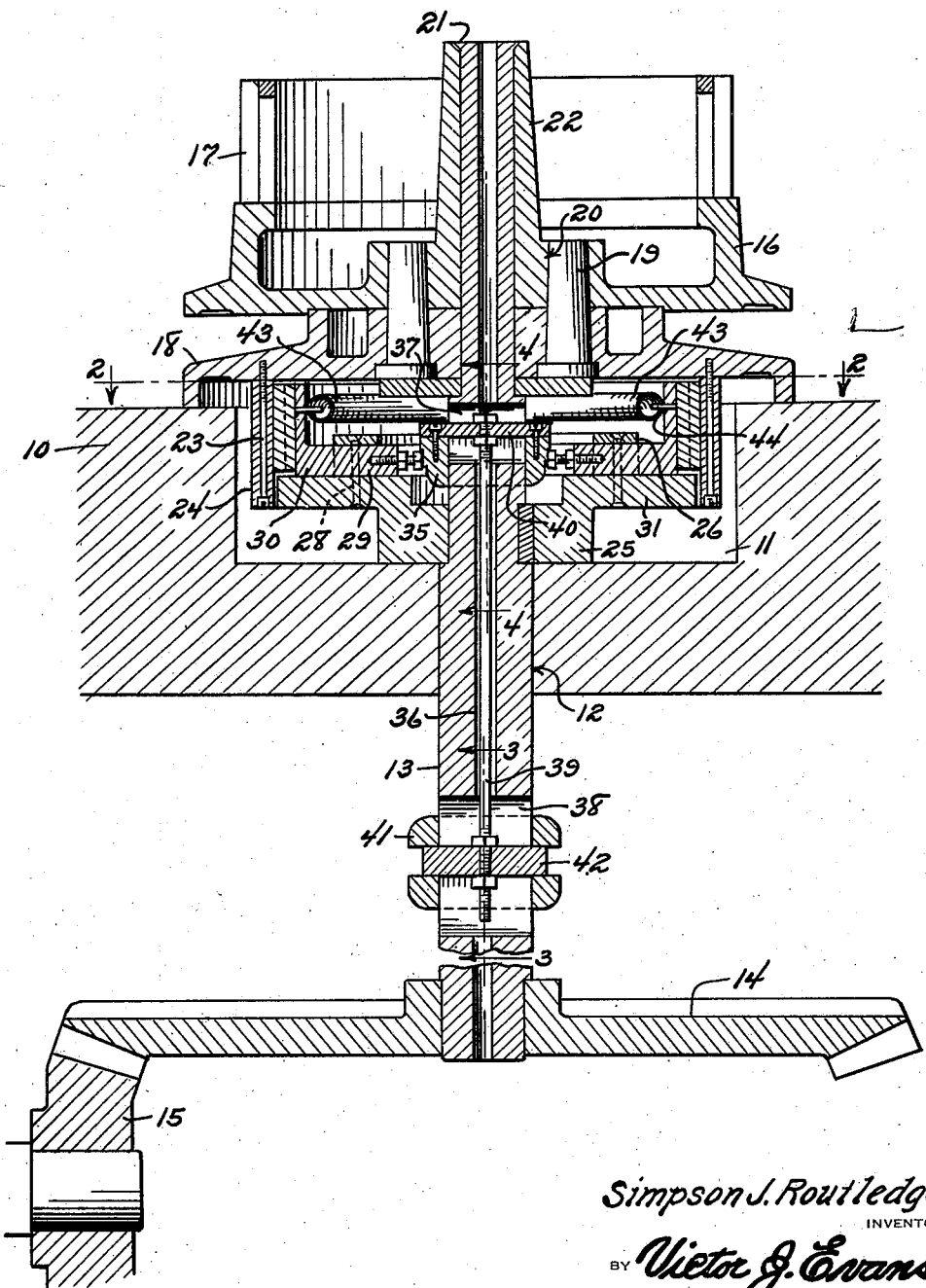
Figure 1 is a section taken longitudinally thru the spindle of a wire block and also thru the table or bench on which said block is mounted.

Referring to the drawings in detail the same reference characters designating the same parts in all views of the drawings, 10 designates a work table or bench in which is formed a depression 11 in which the mechanism of a wire block is set. Concentric with this depression 11 the table is provided with an opening 12 thru which the spindle of the wire block may extend to a point beneath the table. 13 designates a spindle of the wire block to the end of which is secured driving gear 14 in mesh with a gear 15 connected with a source of power. Mounted on the other end of the spindle is a wire block 16 on which the wire is wound. Said block may be provided with a dismountable ring 17, as is usual in such mechanism. The wire block 16 is preferably connected to the spindle through the disk 18 which is secured to the block in any suitable manner and is provided with adjusting lugs 19 which fit in apertures 20 formed in the wire block. The wire block may be further secured in place by peening over the end of the spindle as at 21 against the upper edge of the hub 22 of the wire block.

The foregoing constitutes no part of my invention which is directed to the clutch mechanism now about to be described. Secured to the undersurface of the disk 18 by any suitable means as by machine screws 23 is a friction ring 24, the purpose of which will presently appear. Secured to the spindle by a press fit and key or by any other suitable means is a hub 25 to the upper surface of which is secured a retaining and guide ring 26 having a plurality of radially extending apertures 27 formed therein. The securing means may be of any suitable character, as pins or rivets 28. The apertures or slots have received therein the projecting guide members 29 of the friction shoes 30, the shoes being arranged circumferentially about and above the projecting flange 31 of the hub 25. The shoes are provided on their outer surface with dove tailed slots 30ª adapted to receive the dove tailed sections 32 on friction block 33, which may be of hardwood or any other suitable material. The opposite ends of the guide members to which the shoes are secured are preferably provided with adjusting screws 34 which abut against the cam face of the spreader block 35 slidably mounted on the spindle 13. The spindle is provided with a longitudinal central bore 36 in which is slidably mounted the rod 39 to which the spreader block 35 is connected at its upper end by the cross member 40. It will be noted that the spreader block is stepped to provide cylindrical portions of relatively different diameters, whereby the block is capable of self adjustment to compensate for wear of the shoes. The lower end of said rod is connected by a cross member 42 to a guide ring 41. The cross members 40 and 42 extend through apertures 37 and 38 formed in the spindle. The friction shoes 30 are connected together by means of a helical spring 43 secured internally and circumferentially thereof, said spring being attached to the shoes by means of staples or hooks 44.

In addition, when it is desired to connect the wire block 16 rotatably to the spindle the guide ring 41 is pressed downwardly in any suitable manner as by a lever attached in the groove thereof, said lever not being shown for the sake of clearness and being of any usual type, whereupon the spreader block 35 will press outwardly against the heads of the screws 34 forcing them outwardly on the hub and pressing the friction shoes mounted thereon against the ring 24, whereupon the disk 18 and the wire block 16 will rotate with the spindle 13, it being understood that the wire block 16 and the disk 18 are loosely mounted on said spindle. When it is desired to release the clutch mechanism it is merely necessary to move the spreader block 35 in an upper direction whereupon the heads of the screws 34 will be free to move inwardly under the influence of the spring 43.

Having described my invention, what I claim is:

1. A clutch comprising a rotatable spindle having a hub mounted thereon, a guide ring carried by the hub and provided with radially disposed passages, a friction ring arranged concentric with the hub, radially movable shoes slidable in said passages of the ring and adapted to be moved outwardly against said friction ring, adjusting screws associated with the inner ends of said shoes, a spreader block mounted for sliding movement on said spindle and also rotatable therewith, and arranged to directly contact with said screws, said block being stepped to provide cylindrical portions of relatively different diameters, whereby the block is capable of self adjustment to compensate for wear of the shoes, and means for moving said spreader block.

2. A clutch comprising a rotatable spindle having a hub mounted thereon, a guide ring carried by the hub and provided with radially disposed passages, a friction ring arranged concentric with the hub, radially movable shoes, each including a guiding pin slidable through one of the passages of said ring and adapted to be moved outwardly to force the shoe into engagement with said friction ring, adjusting screws associated with the inner ends of said guide pins, a spring arranged circumferentially about the guide ring and connecting said shoes, said spindle having a longitudinal bore, a rod slidable through said bore, a spreader block supported on the spindle for rotation therewith and connected with said rod, whereby the block can also be moved longitudinally of the spindle, said block being stepped to provide cylindrical portions of relatively different diameters, adapted to singly engage the said screws, whereby the block is capable of adjustment to compensate for wear of the shoes, and means for operating said rod.

In testimony whereof I affix my signature.

SIMPSON J. ROUTLEDGE.